Oct. 1, 1974

R. J. CHARLES ET AL    3,839,537

PROCESS FOR PRODUCING DEUTERIUM-RICH GAS CONCENTRATE
AND TRANSITION METAL-RARE EARTH INTERMETALLIC
HYDRIDE-DEUTERIDE

Filed Dec. 21, 1972      2 Sheets-Sheet 1

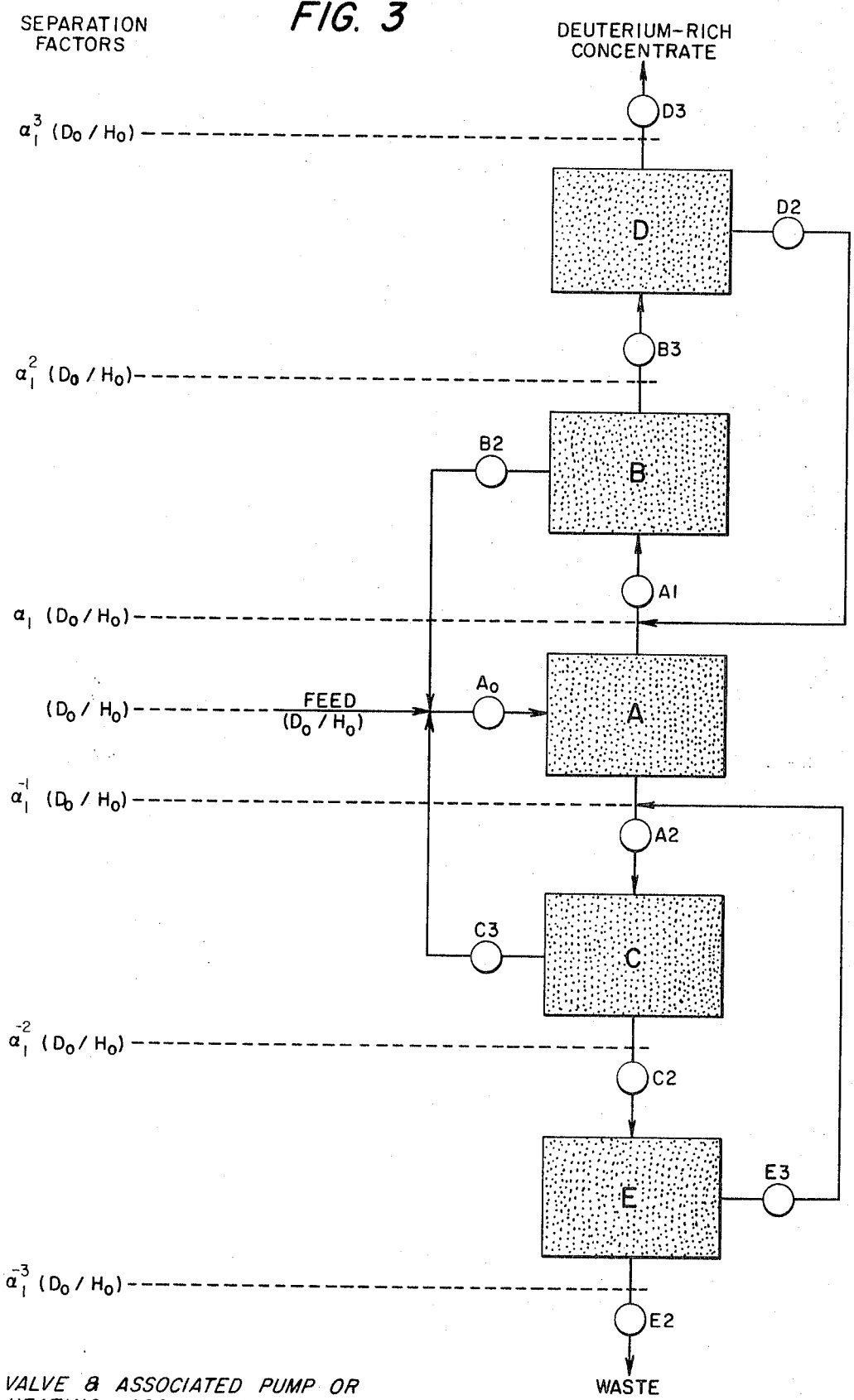

United States Patent Office 3,839,537
Patented Oct. 1, 1974

3,839,537
PROCESS FOR PRODUCING DEUTERIUM-RICH GAS CONCENTRATE AND TRANSITION METAL-RARE EARTH INTERMETALLIC HYDRIDE-DEUTERIDE
Richard J. Charles, Schenectady, and Robert E. Cech, Scotia, N.Y., assignors to General Electric Company
Filed Dec. 21, 1972, Ser. No. 317,425
Int. Cl. C01b 4/00, 4/12; C01f 17/00
U.S. Cl. 423—263                                   7 Claims

ABSTRACT OF THE DISCLOSURE

Process for producing deuterium-rich gas concentrate and novel transition metal-rare earth intermetallic hydride-deuterides. Particles of a $T_5RE$ transition metal-rare earth intermetallic compound are contacted with a hydrogeneous gas in a reaction zone to selectively absorb the hydrogen and deuterium components therefrom forming a hydride-deuteride of the compound. Such contact is continued until absorption of hydrogen and deuterium is substantially complete as indicated by a substantial stabilization of pressure in the reaction zone. The resulting particles of transition metal-rare earth intermetallic hydride-deuteride are desorbed sequentially to produce a deuterium-rich gas concentrate containing deuterium in an amount at least about 0.1% by volume greater than that present initially in the hydrogeneous gas.

---

This invention is directed to a process for producing deuterium-rich gas concentrate and novel transition metal-rare earth intermetallic hydride-deuterides.

Deuterium is a stable isotope of hydrogen of mass 2 and is ordinarily designated D with the molecular form being $D_2$. It occurs in natural hydrogen and hydrogenous gases such as decomposed hydrocarbons. Deuterium has a number of uses in the fields of nuclear energy and chemistry, but because no inexpensive method has been available to produce it in quantity, its use has been limited.

The present invention provides an economical and practical process for producing deuterium-rich gas concentrate as a source of deuterium as well as novel transition metal-rare earth intermetallic hydride-deuterides.

Those skilled in the art will gain a further and better understanding of the present invention from the detailed description set forth below, considered in conjunction with the figures accompanying and forming a part of the specification, in which:

FIG. 1. is a chart bearing curves based on known gas compositions determined in the literature for the overall gas reaction $H_2+D_2 \rightleftharpoons 2HD$ at 20° C. equilibrium and showing their relationship to compositions of collected gas samples of the accompanying example.

FIG. 3 shows a cascade separator arrangement of five stages which illustrates the basic requirements for multi-element separation of deuterium from impure hydrogen by $T_5RE$ sorption elements.

Figure 1:
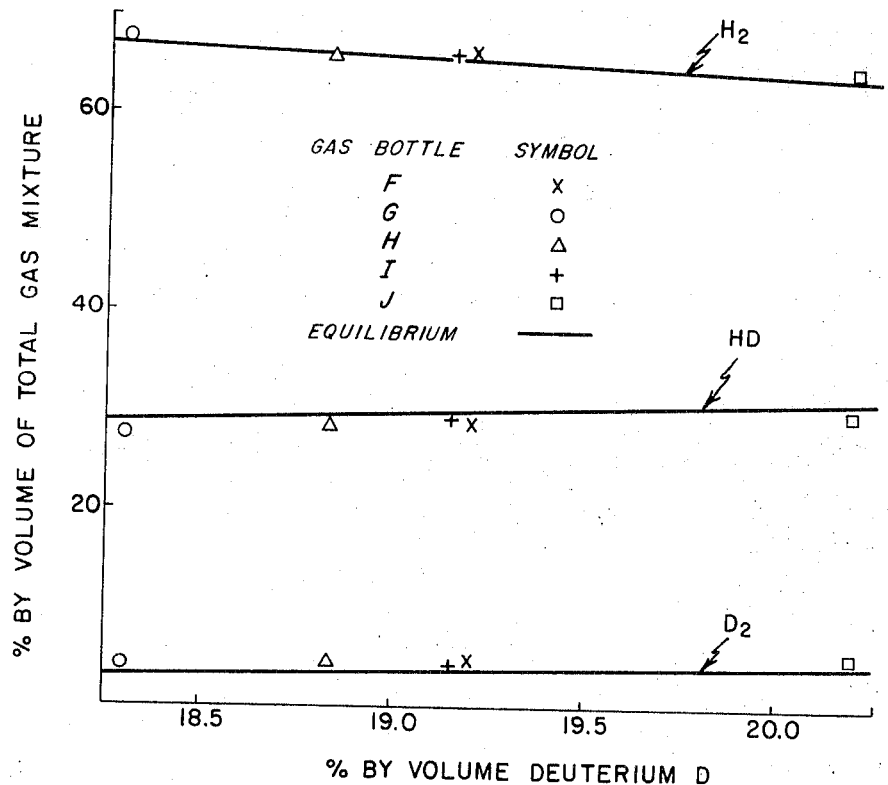

Briefly stated, the present process comprises contacting particles of a transition metal-rare earth intermetallic compound with a hydrogenous gas to selectively absorb the hydrogen and deuterium components of the hydrogenous gas forming a hydride-deuteride of the compound. Such contact is continued until absorption of hydrogen and deuterium is substantially complete as indicated by a substantial stabilization of pressure in the reaction zone. The resulting particles of transition metal-rare earth intermetallic hydride-deuteride are desorbed sequentially to produce a deuterium-rich gas concentrate containing deuterium in an amount at least about 0.1% by volume greater than that present initially in the hydrogenous gas.

Transition metal-rare earth intermetallic compounds exist in a variety of phases. It is the $T_5RE$ single phase compounds where T is a transition metal and RE is a rare earth metal which are operable in the present invention. Since the $T_5RE$ single phase may vary in composition, its phase composition can be determined from the phase diagram for the particular system or empirically. Generally, in the present process, the $T_5RE$ compound has a composition within 15% by weight of the stoichiometric composition.

In the present invention the transition metal is selected from the group consisting of cobalt, nickel, iron, manganese and alloys thereof, and preferably it is cobalt or nickel.

The rare earth metals useful in forming the present $T_5RE$ intermetallic compounds are the 15 elements of the lanthanide series having atomic numbers 57 to 71 inclusive. The element yttrium (atomic number 39) is commonly included in this group of metals and, in this specification, is considered a rare earth metal. A plurality of rare earth metals can also be used to form the present intermetallic compounds which, for example may be ternary, quaternary or which may contain an even greater number of rare earth metals as desired.

Representative of the cobalt-rare earth compounds useful in the present invention are cobalt-cerium, cobalt-praseodymium, cobalt-neodymium, cobalt-promethium, cobalt-samarium, cobalt-europium, cabolt-gadolinium, cobalt-erbium, cobalt-thulium, cobalt-ytterbium, cobalt-lutecium, cobalt-yttrium, cobalt-lanthanum and cobalt-misch metal. Examples of specific ternary compounds include cobalt-cerium-praseodymium, cobalt-yttrium-praseodymium, and cobalt-praseodymium-misch metal. Typical of the nickel-bearing compounds is nickel-lanthanum.

The $T_5RE$ compound of the present process can be prepared by a number of methods. For example, it can be prepared by arc-melting the transition metal and rare earth metal together in the proper amounts under a substantially inert atmosphere such as argon and allowing the melt to solidify. To prevent significant oxidation, the molten alloy should, preferably, also be cooled in an atmosphere in which it is substantially inert such as a noble gas or under a vacuum. Preferably, the melt is cast into an ingot.

In carrying out the present process, the cast body is converted to particles of a relatively coarse size which are conditioned to produce particles of the $T_5RE$ compound of fine size with surfaces significantly free of oxide. The conditioning is necessitated by the rare earth component of the compound which forms a thin coating of oxide rapidly which bars proper absorption of the hydrogen and deuterium components of the hydrogenous gas in the present process. Specifically, the cast body is crushed to particles which for best results range in size from about 1 millimeter to 5 millimeters. The particles are placed in a reaction zone. Hydrogen is charged into the zone at elevated pressure above the dissociation pressure of the $T_5RE$ hydride and preferably at room temperature where, at pressures preferably ranging from about 40 atmospheres to 150 atmospheres, it diffuses through the oxide layer forming a hydride of the compound and causing volume expansion which breaks up the particles to expose clean surfaces. These surfaces permit further absorption of hydrogen forming more hydride and causing additional breaking up of the particles until particles of fine size ranging from about 5 to about 100 microns are formed. Any hydrogen remaining in the zone is then removed and the pressure in the zone is lowered below the dissociation pressure of the hydride, i.e. at a pressure at which the hydride releases hydrogen at a signficant rate, preferably to a substantial vacuum at room temperature, to desorb hydrogen therefrom leaving particles substantially or completely $T_5RE$ compound ranging in size from about 5 to 100 microns with surfaces which are significantly free of oxide. Hydrogenous gas is then introduced into the reaction zone to carry out the present absorption step.

The hydrogenous feed gas used herein is one containing free hydrogen and hydrogen deuteride and/or free deuterium and it is a gas in which the $T_5RE$ intermetallic particles are substantially inert except for the selective absorption of hydrogen and deuterium therefrom. Specifically, the present hydrogenous gas should not have a significantly deteriorating effect on the $T_5RE$ compound such as, for example, one containing a significant amount of oxygen or halide. Representative of the hydrogenous gases which can be used in the present process are natural hydrogen and hydrogen bearing gases such as the decomposed products of methane, ethane, propane, butane and natural gas.

To carry out the absorption step of the present process, the hydrogenous gas is charged into the reaction zone until the pressure in the zone stabilizes indicating that no additional significant amount of hydrogen and deuterium can be absorbed by the $T_5RE$ material. Specifically, after a volume of hydrogenous gas is initially charged into the zone, the zone decreases in pressure indicating that hydrogen and deuterium have been absorbed by the $T_5RE$ particles and that additional hydrogenous gas can be introduced into the zone to proceed with additional absorption by the $T_5RE$ material. The absorption step is carried out above the dissociation pressure of the $T_5RE$ hydride-deuteride compound formed, i.e., above the pressure at which the hydride-deuteride compound releases hydrogen and deuterium. Then dissociation pressure is a function of temperature. For practical purposes, to shorten the absorption time period, the absorption step is carried out at a pressure significantly higher than the dissociation pressure of the resulting $T_5RE$ hydride-deuteride compound, i.e., at least about 20% higher and preferably 100% higher than the dissociation pressure of the $T_5RE$ hydride-deuteride compound formed. The present absorption step is completed in less than four hours and preferably within about one minute to 30 minutes.

The absorption step can be carried out by techniques which are essentially isothermal or isobaric. Variations of both these techniques can be used in which pressure or temperature gradients in each $T_5RE$ compound are established. In carrying out the absorption step by an isothermal technique, the specific pressure range which can be used depends largely on the particular temperature of the zone and the dissociation pressure of the particular transition metal-rare earth hydride-deuteride compound at that temperature. Preferably, the isothermal embodiment of the present absorption step is carried out at room temperature. In carrying out the absorption step by an isobaric technique, the specific temperature range which can be used depends largely on the particular pressure of the reaction zone and the dissociation pressure of the particular transition metal-rare earth hydride-deuteride.

The transition metal-rare earth hydride-deuteride compound produced by the absorption step is a novel material having a composition which depends largely on the absorption capacity of the particular $T_5RE$ compound used and the particular composition of the hydrogenous gas used. Its composition may be given as $T_5RE\ H_xD_y$ where H is absorbed hydrogen and D is absorbed deuterium.

When the absorption step is completed, any depleted hydrogenous gas which may be present in the reaction zone is recovered at pressures above the dissociation pressure of the hydride-deuteride compound, preferably at pressures at least 10% higher than the dissociation pressure of the compound, thereby ensuring its recovery substantially separately without significant desorption of the hydride-deuteride compound, i.e. without containing significant amounts of hydrogen and deuterium which may desorb from the compound. The recovery of the depleted hydrogenous gas and desorption of the compound to recover the present deuterium-rich gas concentrate can be carried out sequentially by conventional techniques such as, for example, by a suitable valving and gauging system.

The particles of $T_5RE$ hydride-deuteride compound are desorbed sequentially to produce the present deuterium-rich gas concentrate leaving particles which are substantially or completely $T_5RE$ compound. The desorption step is carried out below the dissociation pressure of the $T_5RE$ hydride-deuteride compound, i.e., a pressure at which the hydride-deuteride compound releases hydrogen and deuterium at a significant rate, within 30 minutes and preferably within one minute.

In the initial stages of the desorption step, hydrogen is preferentially released resulting in a deuterium-improverished fraction and in the final stages deuterium is preferentially released resulting in the deuterium-enriched fraction of the present invention. Therefore, in carrying out the desorption step, the initial desorption of the hydride-deuteride compound produces a hydrogen-rich gas containing a ratio of deuterium to hydrogen lower than that present in the hydrogenous feed gas. However, as desorption continues, the ratio of deuterium to hydrogen in the desorbed gas increases and when it about equals that of the hydrogenous feed gas, collection of the deuterium-rich gas concentrate of the present invention is preferentially begun since, from this desorption stage, the ratio of deuterium to hydrogen in the gas being desorbed will increase. The ratio of deuterium to hydrogen in the hydrogenous feed gas and in the gas recovered by desorption can be determined by conventional techniques, such as, for example, by means of a mass spectrometer. The completion of the desorption step can be determined by isolating the zone, i.e., by the closing of suitable valves, and then checking the pressure of the zone. An increase in the pressure of the zone indicates that hydrogen and deuterium are still being released from the particles.

The desorption step can be carried out by techniques which are essentially isothermal or isobaric. Variations of both these techniques can be used in which pressure or temperature gradients in each $T_5RE$ compound are established. In carrying out the desorption step by an isothermal technique, the specific pressure range which can be used depends largely on the particular temperature of the zone and the dissociation pressure of the particular transition metal-rare earth hydride-deuteride compound at that temperature. Preferably, the isothermal embodiment of the present desorption step is carried out at room temperature. In carrying out the desorption step by an isobaric technique, the specific temperature range which can be used depends largely on the particular pressure of the reaction zone and the dissociation pressure of the particular transition metal-rare earth hydride-deuteride compound.

The deuterium-rich gas concentrate of the present invention contains deuterium in an amount at least about 0.1% by volume greater than that present in the hydrogenous feed gas. Generally, it contains deuterium in an amount ranging from about 0.1% by volume to about 5% or higher by volume greater than that present initially in the hydrogeneous feed gas depending largely on the particular $T_5RE$ compound and hydrogenous gas used. The deuterium content of the present deuterium-rich gas concentrate is in the form of molecular deuterium $D_2$ and may also be in the form of hydrogen deuteride HD. This deuterium-rich gas concentrate can be again enriched in deuterium, i.e. its content of deuterium can be increased additionally by an amount ranging from about 0.1% by volume to about 5% by volume or higher, by repeating the absorption and desorption steps of the present process.

Specifically, the deuterium-rich gas concentrate of the present invention can be enriched in deuterium to the extent desired by repeating the cycle of absorption and desorption in the present process. Also, the desorbed material, which is substantially or completely $T_5RE$ compound, can be used repeatedly to carry out the absorption step.

The invention is further illustrated by the following example:

EXAMPLE

This example was carried out at substantially room temperature.

A reaction cell, suitable for use at high gas pressures, was constructed with an internal volume of about 4.5 cc. and charged with 12.6 grams of crushed $Co_5Sm$ ingot (nominally 34.5% Sm, 65.5% Co), having an average particle size of about 3 millimeters. Provision was made for the injection of either or both $D_2$ or pure $H_2$ in known amounts.

The coarse particles of $Co_5Sm$ compound were conditioned by charging the cell with pure hydrogen gas to form the hydride thereof causing a volume expansion and break up of the particles and then desorbing the hydride to produce particles of $Co_5Sm$ compound of fine size with surfaces significantly free of oxide. Specifically, the cell was pressurized several times over a period of 4 days to 1500 p.s.i.g. or about 105 atmospheres of pure $H_2$ at room temperature. After several chargings and dischargings of $H_2$ and desorption of the hydride under a substantial vacuum which usually was complete within a few minutes as shown by no buildup of hydrogen pressure in the cell, i.e., the cell remained at a substantial vacuum, the resulting particles of $Co_5Sm$ compound had a size ranging from about 5 to about 20 microns.

A number of runs were than conducted with pure hydrogen or deuterium alone. It was found that the fine particles of $Co_5Sm$ compound were conditioned to absorb or desorb about 1000 to 1250 cc. (STP) of $H_2$ or $D_2$ within about 5 minutes at room temperature under total pressures, respectively, greater or less than the dissociation pressure of the compounds in the cell. The desorption runs showed a dissociation pressure for the $Co_5Sm$ hydried at room temperature as approximately 4 atmospheres. Additional runs indicated that the $Co_5Sm$ deuteride also dissociated at pressures of 4 atmospheres and less. The $Co_5Sm$ deuteride was then desorbed under substantial vacuum leaving the fine particles of $Co_5Sm$ compound.

To illustrate the absorption step of the present invention, a gas mixture comprised of about 1000 cc. (STP) of pure $H_2$ and about 250 cc. (STP) of $D_2$, i.e., about 20% by volume deuterium, was used. Portions of the gas mixture were successively charged into the cell at 600 p.s.i.g. where after each charge until the last the cell showed a loss of pressure indicating absorption by the $Co_5Sm$ compound. With the last charge the pressure in the zone remained substantially stable at 600 p.s.i.g. indicating that substantial equilibrium had been attained and that the $Co_5Sm$ material could not absorb additional hydrogen and deuterium.

Although the absorption was essentially complete in a few minutes, as indicated by the stabilization of cell pressure, up to about four hours were allowed to elapse in order to allow the hydriding and deuteriding conditions to approach equilibrium under an overall gas pressure of about 600 p.s.i.g. or about 42 atmospheres.

By a suitable valving and gauging system, the cobalt-samarium-hydride-deuteride compound was desorbed at a pressure below its dissociation pressure at a significant rate. Specifically, desorption was performed such that the evolving gases were collected at known pressures in calibrated gas bottles (F, G, H, I, J) introduced sequentially to the desorbing system. Table I gives the collection results.

TABLE I.—DESORPTION OF COBALT SAMARIUM HYDRIDE-DEUTERIDE

| Gas bottle | Volume (cc.) (incl. connections) | Final gas bottle pressure | Vol. (STP) desorbed, cc. | Cumulative time |
|---|---|---|---|---|
| F | 332 | 0.47 atmos. | 156 | 1 sec. |
| G | 182 | 1.0 atmos. | 182 | 11 sec. |
| H | 182 | 1.07 atmos. | 194 | 41 sec. |
| I | 182 | 1.07 atmos. | 194 | 3 min., 21 sec. |
| J | 262 | 1.0 atmos. | 262 | 13 min., 11 sec. |
| Total | | | 988 | |

The gases in bottles F to J were analyzed by a quadrupole mass spectrometer for relative concentrations of masses 1 through 4 (i.e., H, $H_2$ or D, HD, $D_2$). Table II gives the results.

TABLE II.—MASS SPECTROMETER ANALYSIS

| | Relative peak heights ($H_2$=100) | | | | |
|---|---|---|---|---|---|
| Mass. No. | F | G | H | I | J |
| 1 (H) | 3.5 | 3.0 | 2.7 | 2.8 | 1.3 |
| 2 ($H_2$ or D) | 100 | 100 | 100 | 100 | 100 |
| 3 (HD) | 42 | 40 | 42 | 43 | 46 |
| 4 ($D_2$) | 7.4 | 6.5 | 6.75 | 6.9 | 7.9 |

Relative peak heights are proportional to the volumetric gas concentrations. The basic exchange reactions occurring in the hydriding and deuteriding of the $Co_5Sm$ are of the form:

$$5H_2 + 2Co_5SmD_y \rightarrow 5HD + 2Co_5SmH_x \quad (1)$$

$$5D_2 + 2Co_5SmH_x \rightarrow 5HD + 2Co_5SmD_y \quad (2)$$

The overall gas reaction is therefore $$((1)+(2)) H_2 + D_2 \rightleftharpoons 2HD \quad (3)$$

where the equilibrium constant K expressed in partial pressures is $$K[P_{HD}]2/[P_{H2}][P_{D2}] \quad (4)$$

The appreciable concentration of HD, shown by the results in Table II, indicate that Eq. 3 is wholly or partially operative. Table II also indicates that the ionization process in the mass spectrometer results in the observance of a relatively small amount of dissociated species (i.e., H atoms of mass 1) in the spectrometer gas stream. Three dissociation reactions will occur in amounts proportional to the concentrations of the undissociated species available. Eqs. 5 to 7 are the reactions:

$$HD \rightarrow H + D \quad (5)$$

$$\tfrac{1}{2} H_2 \rightarrow H \quad (6)$$

$$\tfrac{1}{2} D_2 \rightarrow D \quad (7)$$

From simple mass balances minor corrections using Equations 5–7 may thus be made to the results given in Table II to more accurately determine the concentrations of $H_2$, HD and $D_2$ in the gases as they first enter the mass spectrometer (i.e., the mass 1 peak height (H atoms) results from proportionate dissociation of $H_2$ and HD; proportionate dissociations of $D_2$ and D contribute to the mass 2 peak values). Table III gives the corrected gas analyses.

TABLE III.—CORRECTED MASS SPECTROMETER GAS ANALYSES

| | Sample bottle | | | | |
|---|---|---|---|---|---|
| Percent by volume | F | G | H | I | J |
| $H_2$ | 66.55 | 67.85 | 66.9 | 66.3 | 64.8 |
| HD | 28.50 | 27.7 | 28.54 | 29.1 | 30.0 |
| $D_2$ | 4.95 | 4.45 | 4.56 | 4.6 | 5.2 |
| Total | 100 | 100 | 100 | 100 | 100 |
| D | 19.2 | 18.3 | 18.83 | 19.15 | 20.2 |
| H | 80.8 | 81.7 | 81.17 | 80.85 | 79.8 |

The equilibrium constant, K of Eq. 4, has been determined in the literature as 3.27 for 20° C. FIG. 1 constructed from Table III and the equilibrium Equation 4 using the above constant shows the compositions of the collected gas samples from the desorption experiments relative to equilibrium values.

Specifically, the graphs in FIG. 1 are based on known values in the literature for Equation 4 at 20° C. equilibrium given a specific volume fraction of deuterium D and plotting the corresponding known amounts of $H_2$, HD and $D_2$. The plotted symbols for the gas sample bottles F through I show the close relationship between the collected gas compositions and those determined in the literature. FIG. 1 illustrates that in the presence of finely divided $Co_5Sm$ and $Co_5Sm(D_yH_x)$ equilibrium is established rapidly. This is an advantage over the prior art where, in the absence of a catalyst, equilibrium of Eq. 3 is reported to be difficult to attain.

Table III also shows that the gas samples evolved from the hydride and deuteride into Bottles G and H exhibit percent D values less than Bottle F which contains, as a major fraction, the pressurized covering gas existing in the pressure cell before the onset of desorption. The composition of the gas in Bottle F would be expected and assumed to be near the composition of the originally injected gas. Bottle I shows a percent D value about equal to that of Bottle F and Bottle J shows a percent D value greater than that of the pressurized covering gas in Bottle F. These results indicate that $H_2$ is preferentially released in the initial stages of the desorption process and that $D_2$ is preferentially released in the final stages. Similarly, in absorption the hydriding process would proceed more rapidly than the deuteriding process. These differences in desorption and absorption kinetics in mixed gases can be utilized as the basis for separating $D_2$ from $H_2$ or hydrogenous gases in the present invention.

Specifically, in this example, the deuterium-enriched fraction was comprised of Samples I and J and the deuterium impoverished fraction was comprised of Samples G and H. The percent D value of the desorbed gas, i.e., Samples G through J, and consequently that of the feed gas, calculates to be 19.13%. This was determined by multiplying the percent D value of Samples G through J by their respectively gas volumes to get the volume of deuterium in each bottle, adding the resulting products which totalled 159 cc. and dividing by the total volume of gas in bottles G through J, 832 cc. The percent D value of 19.13% is about the same value as Sample F containing the original cover gas as a major fraction. Also, the average deuterium content of the deterium-rich gas concentrate comprised of fractions I and J calculates to be 19.7% which is an increase in deuterium content of about 3% over that of the hydrogenous feed gas.

The present process can be utilized to produce a deuterium-rich gas concentrate containing 100 parts of deuterium and 1 part of hydrogen by means of a cascade separation system. This could be carried out, for example, by considering the cell arrangement of the above Example as a separating element which produces a deuterium-enriched fraction such as the sum of Samples I and J of the Example and a deuterium impoverished fraction such as the sum of Samples G and H of the Example.

In the above Example the deuterium content of the feed to the separating element calculates to be 19.13% and that of the D enriched fraction is 19.7%. The separating element is given schematically in FIG. 2. The above compositions result in the following separating factors, $\alpha$, for this separating element.

$\alpha_1$ (enriched fraction)
= (percent D/percent H)$_{out}$/(percent D/percent H)$_{in}$
= (19.7/80.3)/(19.13/80.87)
= 1.037

Figure 2:
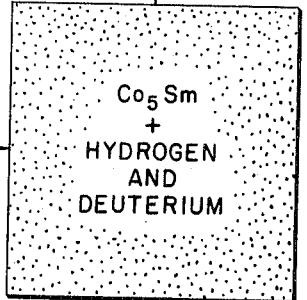
FIG. 2 illustrates the production of a deuterium-enriched gas concentrate in the present invention.

$\alpha_2$ (impoverished fraction)
= (percent D/percent H)$_{out}$/(percent D/percent H)$_{in}$
= (18.57/81.43)/(19.13/80.87)
= 0.963 ≈ $\alpha_1^{-1}$ An enrichment separating factor of 1.037 (i.e., $\alpha_1$) is relatively high and particularly so for an approximately 50/50 feed split as shown in FIG. 2. If a separating split of 25/25, i.e., J/(G+H+I), rather than 50/50 had been considered, the separating factor from the data in Table III would have been (20.2/79.8)/(19.13/80.37) = 1.069.

For an ideal cascade separation system, where all feedback flow returns from system stages are reintroduced back into the system at points where the feedback compositions equal the system flow compositions, the relation between the total enrichment separating factor, $\alpha_n$, at stage $n$ is related to the separating factor for a single element, $\alpha_1$, by $$\alpha_n = \alpha_1^n \qquad (8)$$

Thus, to produce a deuterium-enriched gas product of D/H ratio equal to 100/1 from a feed material of D/H ratio to $10^{-4}$ (natural occurrence) would require 380 stages for $\alpha_1 = 1.037$ and 206 stages for $\alpha_1 = 1.069$. Such stage numbers are practical.

The absorption-desorption of $T_5R$ compounds in accordance with the present invention requires batch or pseudo batch rather than continuous operation of each stage, thereby requiring exposure of the separation element materials sequentially. Rapid approach to equilibrium, however, permits a highly pure $D_2$ gas fraction as a concentrate from a cascade separation system in a reasonable length of time.

FIG. 3 shows a cascade separator arrangement of five stages, wherein each stage can be considered as having the cell arrangement of the above example as a separating element, which illustrates the basic requirements for multi-element separation of deuterium from impure hydrogen by $T_5R$ sorption elements. For repetitive operation the valving sequences are listed in Table IV. Each valve, when opened, actuates an associated pump for isothermal operation or a heating-cooling system for isobaric operation. The pressure or temperature relationships, coupled with valve operation, are also detailed for each stage in Table IV. FIG. 3 also indicates theoretical separation factors, relative to the feed deuterium-hydrogen ratio, $D_o/H_o$, for each part of the flow system.

TABLE IV.—CASCADE SEPARATOR VALVING AND PRESSURIZING SEQUENCES

| | A | | B | | C | | D | | E | |
|---|---|---|---|---|---|---|---|---|---|---|
| Valving sequence [1] | Isothermal $P \gtreqless P_{o|T}$ | Isobaric $T \gtreqless T_{o|P}$ | Isothermal $P \gtreqless P_{o|T}$ | Isobaric $T \gtreqless T_{o|P}$ | Isothermal $P \gtreqless P_{o|T}$ | Isobaric $T \gtreqless T_{o|P}$ | Isothermal $P \gtreqless P_{o|T}$ | Isobaric $T \gtreqless T_{o|P}$ | Isothermal $P \gtreqless P_{o|T}$ | Isobaric $T \gtreqless T_{o|P}$ |
| A0, B2, C3, D3, E2 Open | > | < | < | > | < | > | < | > | < | > |
| A2, B3, E3 Open | < | > | < | > | > | < | < | > | < | > |
| A1, C2, D2 Open | < | > | > | < | < | > | < | > | < | > |

[1] All valves closed except those indicated.

NOTE.—$P_{o|T}$ = Dissociation pressure of hydride/deuteride compound at average system temperature.

$T_{o|P}$ = Dissociation temperature of hydride/deuteride compound at average system pressure.

What is claimed is:

1. A process for producing deuterium-rich gas concentrate which comprises providing in a reaction zone coarse particles of $T_5RE$ intermetallic compound having a composition within 15% by weight of stoichiometric composition where T is a transition metal selected from the group consisting of cobalt, nickel, iron, manganese and alloys thereof and RE is a rare earth metal, contacting said coarse particles with hydrogen at elevated pressure to produce a hydride of said compound causing volume expansion and break up of said particles into particles of fine size ranging from about 5 microns to 100 microns, desorbing said hydride leaving particles of substantially $T_5RE$ compound of said fine size, contacting said fine size particles of $T_5RE$ compound with a hydrogenous feed gas to selectively absorb the hydrogen and deuterium components therefrom forming a hydride-deuteride of said compound, said absorption being carried out about the dissociation pressure of the hydride-deuteride formed, said $T_5RE$ compound being substantially inert in said hydrogenous gas except for said absorption of said hydrogen and deuterium, continuing said contact between said fine size particles of $T_5RE$ compound and said hydrogenous gas until said absorption is substantially complete as indicated by a stabilization of pressure in said reaction zone, and sequentially desorbing the resulting transition metal-rare earth-hydride-deuteride compound to produce a deuterium-rich gas concentrate containing deuterium in an amount at least about 0.1% by volume greater than that present in said hydrogenous feed gas, said desorption being carried out below the dissociation pressure of said hydride-deuteride compound.

2. A process according to Claim 1 wherein the temperature of the reaction zone is maintained substantially constant.

3. A process according to Claim 2 wherein the temperature is substantially room temperature.

4. A process according to Claim 1 wherein the pressure of the zone is varied by varying the temperature of the zone.

5. A process according to Claim 1 wherein said $T_5RE$ compound is cobalt-samarium.

6. The $T_5RE$ hydride-deuteride compound produced by the process of Claim 1.

7. The cobalt-samarium hydride-deuteride compound produced by the process of Claim 5.

References Cited

UNITED STATES PATENTS

| | | | |
|---|---|---|---|
| 3,081,156 | 3/1963 | Orbach et al. | 423—648 |
| 3,620,844 | 11/1971 | Wicke et al. | 423—648 |
| 3,711,601 | 1/1973 | Reilly et al. | 423—648 |

OTHER REFERENCES

Novakova et al.: "Collection Czechoslov. Chem. Commun.," vol. 36, 1971, pp. 520–527.

HERBERT T. CARTER, Primary Examiner

U.S. Cl. X.R.

423—648, 644

UNITED STATES PATENT OFFICE
CERTIFICATE OF CORRECTION

Patent No. 3,839,537          Dated October 1, 1974

Inventor(s) Richard J. Charles and Robert E. Cech

It is certified that error appears in the above-identified patent and that said Letters Patent are hereby corrected as shown below:

Column 9, line 9, after "out" delete "about" and
    insert -- above --

Signed and sealed this 11th day of March 1975.

(SEAL)
Attest:

RUTH C. MASON
Attesting Officer

C. MARSHALL DANN
Commissioner of Patents
and Trademarks